United States Patent [19]

Yamano et al.

[11] Patent Number: 4,775,394
[45] Date of Patent: Oct. 4, 1988

[54] PROCESS FOR SEPARATION OF HIGH PURITY GAS FROM MIXED GAS

[75] Inventors: Matsuki Yamano; Tadayoshi Aono, both of Hyogo; Makoto Kurimoto, Ehime; Masaru Uno, Hyogo, all of Japan

[73] Assignees: Nippon Steel Corporation, Tokyo; Sumitomo Chemical Company Limited, Osaka; Seitetsu Kagaku Co., Ltd., Hyogo, all of Japan

[21] Appl. No.: 57,922

[22] PCT Filed: Sep. 11, 1986

[86] PCT No.: PCT/JP86/00465
§ 371 Date: May 6, 1987
§ 102(e) Date: May 6, 1987

[87] PCT Pub. No.: WO87/01611
PCT Pub. Date: Mar. 26, 1987

[30] Foreign Application Priority Data

Sep. 11, 1985 [JP] Japan .................. 60-200900

[51] Int. Cl.[4] .............................. B01D 53/04
[52] U.S. Cl. .............................. 55/26; 55/58; 55/62; 55/68

[58] Field of Search ............... 55/25, 26, 58, 59, 62, 55/68, 74, 75

[56] References Cited

U.S. PATENT DOCUMENTS

| | | | |
|---|---|---|---|
| 3,086,339 | 4/1963 | Skarstrom et al. | 55/26 |
| 3,430,418 | 3/1969 | Wagner | 55/25 |
| 3,636,679 | 1/1972 | Batta | 55/26 |
| 4,013,429 | 3/1977 | Sircar et al. | 55/58 X |
| 4,070,164 | 1/1978 | Miwa et al. | 55/26 |
| 4,077,779 | 3/1978 | Sircar et al. | 55/25 |
| 4,359,328 | 11/1982 | Wilson | 55/26 |
| 4,431,432 | 2/1984 | Amitani et al. | 55/58 X |
| 4,515,605 | 5/1985 | Inoue et al. | 55/26 |
| 4,539,020 | 9/1985 | Sakuraya et al. | 55/58 X |
| 4,578,089 | 3/1986 | Richter et al. | 55/58 X |

Primary Examiner—Robert Spitzer
Attorney, Agent, or Firm—Herbert Dubno

[57] ABSTRACT

In a PSA separation method, a specific gas component is selectively adsorbed from mixture gas. After flushing with gas, the gas component is recovered by desorption. This desorption is divided into initial, middle and final stages. The gas component separated at the middle stage is recovered as product gas, while the gas recovered at the initial and final stages is used as the flushing gas.

5 Claims, 2 Drawing Sheets

PROCESS FOR SEPARATION OF HIGH PURITY GAS FROM MIXED GAS

CROSS REFERENCE TO RELATED APPLICATIONS

This application is a National phase application corresponding to PCT/JP86/0045 filed Sept. 11, 1986 and based, in turn, upon a Japanese application 60-200900 filed Sept. 11, 1985.

The present invention relates to a Pressure Swing Adsorption (PSA) process for the separation and recovery of high purity gas from mixed gas or a gas mixture by the use of adsorbent and by a subsequent gas washing followed by desorption.

BACKGROUND OF THE INVENTION

The Japanese unexamined Patent Publication No. 173116/84 and other literatures already describe processes for separation and purification of a product gas by the Pressure Swing Adsorption method, starting with gas mixtures containing carbon dioxide, methane or other gas components which can be adsorbed relatively easily. The separation and purification processes of carbon dioxide, methane or the like by the PSA method, generally use more than one adsorption tower in which, individually, the pressurization/adsorption step, the washing step, and the desorption step are repeated, and which altogether are operated in combination. After adsorption is completed in a tower, a part of the gas desorbed in another adsorption tower is sent to the adsorption tower to flush the interior, and then, the gas is desorbed at a reduced pressure, a part of which is continuously recovered as product, while the balance is used for flushing of another adsorption tower.

In the conventional process, a large-size unit had to be used to obtain the product gas at high purities, for example, 99% or more and preferably 99.5% or more, because the desired product gas was easily contaminated with other gas components. In order to recover the desired gas component at high purity, it was necessary to flush the interior of the adsorption tower with the same desired gas of relatively high purity for a considerable time, thus flushing the voids with such high purity gas as well as purifying the gas adsorbed on the adsorbent through consequential rise of partial pressure of the desired gas component. This operation resulted in a reduced separation/purification capacity per unit adsorbent. Therefore, the size of the unit had to be increased in order to maintain the capacity, and this fact has posed a problem in the industrial application of the process.

OBJECT OF THE INVENTION

To overcome that described disadvantage an object of the present invention is to enable recovery of a high purity gas with a compact unit.

SUMMARY OF THE INVENTION

In a Pressure Swing Adsorption process for separation and recovery of high purity gas, i.e. in the separation of a desired gas component, from mixed gas by adsorption of the desired gas component by the use of adsorbent and by the subsequent gas flushing followed by desorption, the present invention achieves this object by the division of the desorption step into initial, middle, and final stages and by recovery of the gas desorbed at the middle stage as product gas and at the initial and final stage as gas for a flushing step.

For many years, we have diligently studied the separation and purification of various gas mixtures by the PSA method. Surprisingly we have found that there exist concentration distributions in the purity of the gas desorbed at a reduced pressure.

The process of the present invention is carried out in an adsorption tower filed with an adsorbent wherein the following steps are repeated in succession.

The adsorption step: In this step, the adsorption tower is first pressurized by the introduction of mixed gas, and more mixed gas is introduced and passed through the adsorption tower to enable the desired gas component to be adsorbed.

The flushing step: In this step, which follows the adsorption step the unwanted gas components in the voids of the adsorbent are flushed away by the introduction of a part of the desired gas component previously desorbed having a relatively high concentration.

The desorption step: In this step, the desired gas component adsorbed on the adsorbent is desorbed at a reduced pressure, and the gas desorbed at the middle stage is recovered as product gas, while the gases desorbed at the initial and final stages are used for flushing.

Although more than one adsorption tower is usually used, a single adsorption tower system is possible if a separate storage facility for flushing gas is available. The adsorption step consists of: feeding of mixed gas into the adsorbent layer, thorough adsorption of the desired gas component, and discharging of the non-adsorbed gas out of the adsorption tower. Generally, the quantity of adsorbate increases as the difference between the adsorption and desorption pressure increases, and the quantity also increases as the adsorption temperature decreases.

After completion of the adsorption step, the adsorption tower and the voids among the adsorbent particles contain mixed gas comprising high percentages of gas components other than the desired gas component.

Direct desorption would not produce high purity gas, therefore, because gas components other than the desired component are adsorbed onto the adsorbent. This flushing is conducted with the same desired gas of relatively high purity. The flushing raises the purity of the gas present in the voids among adsorbent particles and purifies the adsorbed gas by the consequent rise in the partial pressure of the desired gas component in the voids. The flushing must be conducted for a considerable time, especially for thorough purification. Otherwise, thorough purification cannot be achieved, and a large amount of gas components other than the desired one will be desorbed during the subsequent desorption step, resulting in an insufficient purity of the desired product.

Next, the desorption step consists of: separating the desired gas component from the adsorbent by decreasing the pressure of the adsorbent which has abundantly adsorbed the desired gas, and discharging the same out of the adsorption tower. Generally, the quantity of the gas desorbed tends to increase as the desorption temperature increases. In the present invention, the desorption step is divided into 3 stages, i.e., initial, middle and final stages, and the gas desorbed at the middle stage is recovered as product. The purity of the desired gas component during the desorption step gradually increases from the initial stage to the middle stage, but gradually decreases with the progress of desorption from the middle stage to the final stage. Namely, if a graph is drawn plotting the desorption progress on the X-axis and the purity on the Y-axis, a curve is obtained with a peak of purity at the middle stage of desorption.

The mode of dividing the gas desorption into initial, middle and final stages is determined according to the required purity of the product. Here, the period from the beginning of desorption to the point when the purity becomes higher than the required one is defined as the initial stage of desorption; the following period until the purity becomes lower than the required one, as the middle stage, and the next period until the end of desorption, as the final stage.

This division of gas desorption can be made by following the desorption time, pressure or gas quantity.

The gas from the initial and final stages of the desorption step can be used for the above-mentioned flushing. While these gases for washing can be stored before use, the normal practice is to operate more than one adsorption tower in combination in such a way that when one of the adsorption towers is at the desorption step, another is at the gas washing step.

The process of the present invention normally uses ambient temperature, and the operating pressures are between approximately atmospheric pressure and 4–5 kg/cm$^2$ G in the adsorption step, and between approximately 50 Torr and atmospheric pressure in the desorption step. When the adsorption step is carried out at approximately atmospheric pressure, the desorption step is carried out up to an end pressure of approximately 50 Torr, and when the former is carried out at 4–5 kg/cm$^2$ G, the latter is carried out at up to an end pressure of approximately atmospheric pressure or approximately 50 Torr.

BRIEF DESCRIPTION OF THE DRAWING

The above and other objects, features and advantages of our invention will become more readily apparent from the following specific description, reference being made to the accompanying highly diagrammatic drawing in which.

SPECIFIC DESCRIPTION

Figure 1:
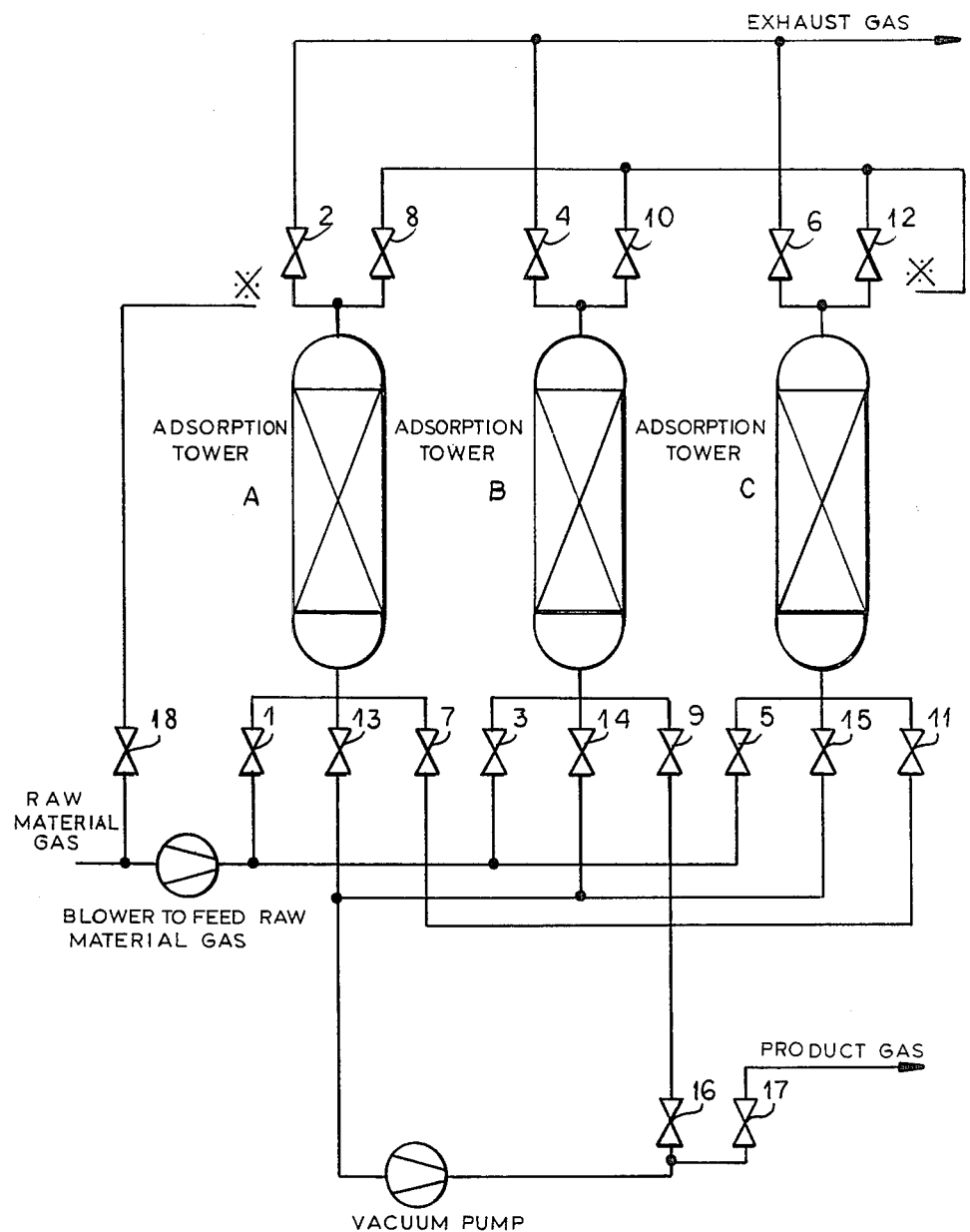
FIG. 1 is a flow diagram of a PSA system for carrying out the present invention.
Figure 2:
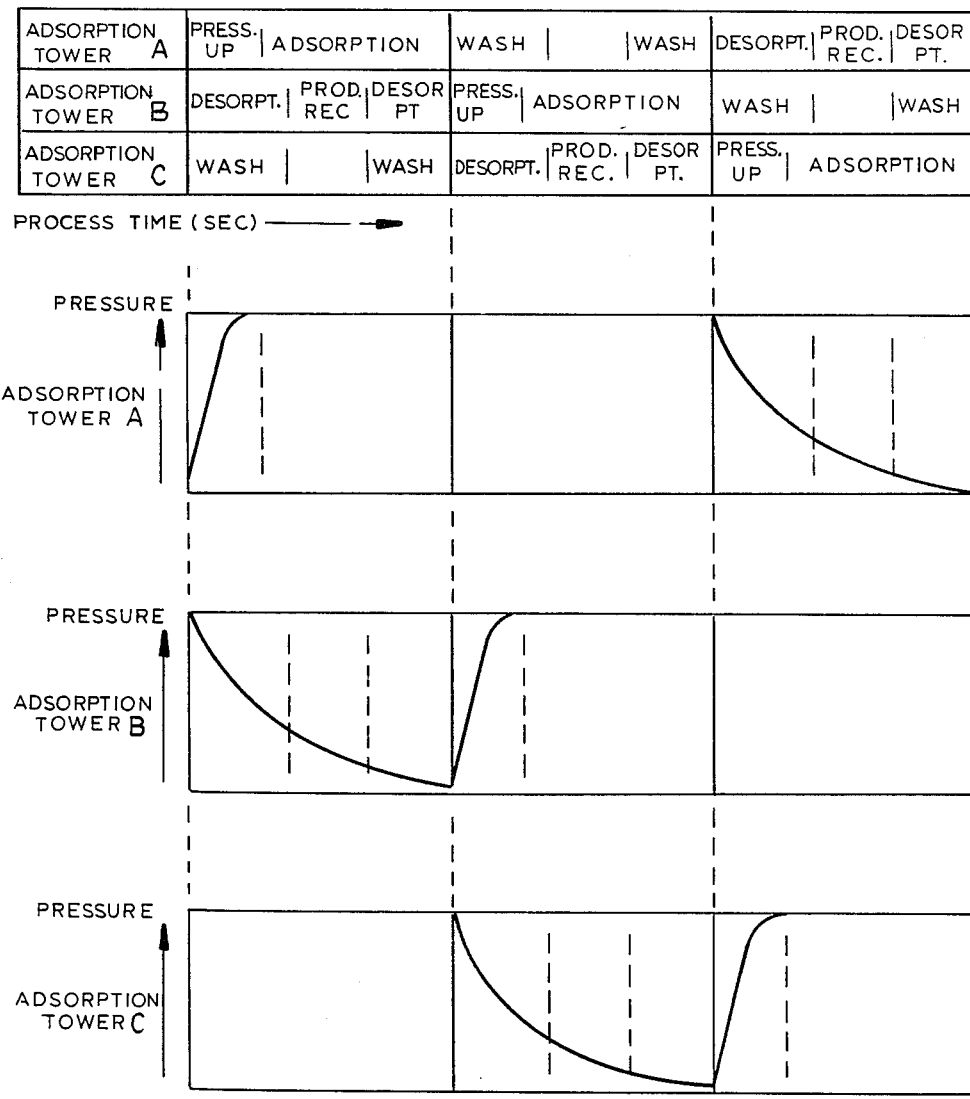
FIG. 2 is a timing diagram illustrating the sequence of operations of the adsorbers of this system.

In order to describe the present invention more specifically, the following example of operation is given wherein a 3-tower type PSA unit is used and the pressure range is between vacuum and atmospheric pressure:

FIG. 1 shows a typical flow sheet of a PSA unit equipped with 3 adsorption towers. The unit is composed of 3 adsorption towers (A, B and C), a blower to feed the raw material gas, a vacuum pump to reduce pressure, and valves (1–18). adsorption towers A–C are each filled with adsorbent, and the raw material gas is fed to one of them (say, Adsorption Tower A by way of example) by the blower through opened valve 1, pressurizing Adsorption Tower A to atmospheric pressure or slightly higher. At this time, valves 2, 7, 8 and 13 are closed. In the adsorption step that follows, valve 2 is opened and the unadsorbed exhaust gas is discharged through that valve to the exhaust gas line.

Next, in the flushing process, valves 1, 2 and 13 are closed and valves 7 and 8 are opened, and the gas containing the desired gas component of a high purity is introduced from adsorption tower C which is at the desorption step to adsorption tower A through valve 15, vacuum pump, valves 1, 6 and 7. The purge gas of the washing step is recycled through valves 8 and 18 to the raw material gas side (suction of the blower for feeding of raw material gas). Finally, in the desorption process, the vacuum pump is used for vacuum desorption. With valves 1, 2, 7 and 8 closed and valve 13 opened, the entire volume of gas from the initial stage of desorption is discharged through the vacuum pump and valves 16 and 9 to adsorption tower B which is in the flushing step. At the time, valve 17 is closed. In the middle-stage desorption that follows, valve 16 is now closed and valve 17 now opened, and the desorbed gas is taken out as product.

Furthermore, in the final stage of desorption, valve 16 is again opened and valve 17 again closed, and the desorbed gas is discharged to Adsorption Tower B. By repeating these operations consecutively in each adsorption tower, high purity gas can be obtained.

The adsorbents used for the present invention include zeolites, activated carbon and molecular-sieve activated carbon.

The applications of the process of the present invention include separation of carbon dioxide, carbon monoxide and the like from blast furnace gas, converter gas or hot-air furnace exhaust gas generated at a steel mill, and separation/purification of easily adsorptive gases from other mixed gases.

By taking out the gas from the middle stage in the desorption step as product gas under the present invention, the desired gas component of an extremely high purity can be separated from the mixed gas. The conventional process, in which a part of the gas desorbed throughout the desorption step is taken out as product and the balance is used as washing gas, does not give high gas purity; the effects of the present invention are extremely high.

SPECIFIC EXAMPLES

The following are examples of the present invention, but the invention is not limited to these examples.

EXAMPLE 1

An exhaust gas of a hot-air furnace of a steel mill ($CO_2$=28 vol.-%, $N_2$=71 vol.-% and $O_2$=1 vol.-%) as the raw mixed gas was treated in a PSA unit equipped with 3 adsorption towers, each of which was filled with 163 liters of molecular-sieved activated carbon (made by Bergwerksverband GmbH, Essen, West Germany) (as shown by the flow sheet in FIG. 1) for separation/purification of carbon dioxide. After pressurizing up to 0.10–0.15 kg/cm$^2$ G in 15 seconds, adsorption was conducted for 135 seconds, and after washing, vacuum desorption was conducted up to the end pressure of 60 Torr. During this desorption, the gas desorbed at pressures between 290 and 150 Torr was recovered as product, while other desorbed gases were fed to another tower which was in the flushing step. The periods of the washing and desorption steps were each 150 seconds. The feed of raw material gas was 100 Nm$^3$/hr, the purity of the product $CO_2$ was 99 vol.-%, the product yield was 13.24 Nm$^3$/hr, and the product recovery was 47.3%.

EXAMPLE 2

A blast furnace gas generated at a steel mill ($CO_2=24$ vol.-%, $O_2=1$ vol.-% and $H_2=3$ vol.-%) as the raw material gas and the same unit as in Example 1 were used for separation/purification of carbon dioxide. After pressurizing up to 0.10–0.15 kg/cm$^2$ in 15 seconds, adsorption was conducted for 105 seconds, and after washing, vacuum desorption was conducted up to an end pressure of 60 Torr. During the desorption, the gas desorbed at pressures between 309–195 Torr was recovered as product, while other desorbed gases were fed to another tower which was at the washing step. The periods of the washing and desorption steps were each 120 seconds. The feed of raw material gas was 120 Nm$^3$/hr, the purity of product $CO_2$ was 99.9%, the product yield was 13.05 Nm$^3$/hr, and the product recovery was 45.3%.

EXAMPLE 3

A gas mixture containing 22 vol.-% $CH_4$ and 78 vol.-% $N_2$ as raw gas was separated in the same unit as in Example 1. After pressurizing up to 0.10–0.15 kg/cm$^2$ G in 15 seconds, adsorption was conducted for 120 seconds, and after washing, vacuum desorption was conducted up to an end pressure of 60 Torr. During the adsorption, the gas desorbed at pressures between 300–180 torr was recovered as product while other desorbed gases were fed to another tower which was at the washing step. The period of the washing and desorption steps were each 135 seconds. The feed of the raw gas was 45 Nm$^3$/h, the purity of product $CH_4$ was 99.9%, the product yield was 4.86 Nm$^3$/h, and the product recovery was 49.1%.

We claim:

1. A pressure swing adsorption method of separating a preferentially adsorbable component from a gas mixture containing same, comprising the steps of:
    (a) pressurizing an adsorbent and passing through the pressurized adsorbent a gas mixture containing a component preferentially adsorbable on said adsorbent to adsorb said component thereon;
    (b) thereafter flushing voids of said adsorbent with a flushing gas having a high concentration of said component; and
    (c) reducing the pressure of said adsorbent in an initial, middle, and final stage of desorption, by
        (c$_1$) desorbing an initial quantity of the component adsorbed on said adsorbent in said initial stage to serve as said flushing gas,
        (c$_2$) thereafter desorbing an additional quantity of said component adsorbed on said adsorbent in said middle stage of desorption and recovering the additional quantity as a high purity product gas containing said component, and
        (c$_3$) thereafter desorbing a further quantity of said component adsorbed on said adsorbent in said final stage of desorption to serve as said flushing gas, whereby said adsorbent is desorbed to again permit adsorption of said component thereon; and
    (d) repeating steps (a) through (c).

2. The method defined in claim 1 wherein the desorption in step (c) is carried out at a vacuum to substantially 50 Torr and in step (c$_2$) the product gas is recovered during the middle stage of desorption between a vacuum of 309 Torr to a vacuum of 150 Torr.

3. The method defined in claim 1 wherein the gas mixture contains carbon dioxide, and said preferentially adsorbable component is carbon dioxide.

4. The method defined in claim 1 wherein said gas mixture is a mixture containing methane and nitrogen, and said preferentially absorbable component is methane.

5. The method defined in claim 1 which is carried out in a three adsorber apparatus with each of the steps (a), (b) and (c) being effected in a respective one of said adsorbers concurrently.

* * * * *